(No Model.)
2 Sheets—Sheet 1.
C. M. COOKE.
GRIDIRON.
No. 322,686. Patented July 21, 1885.
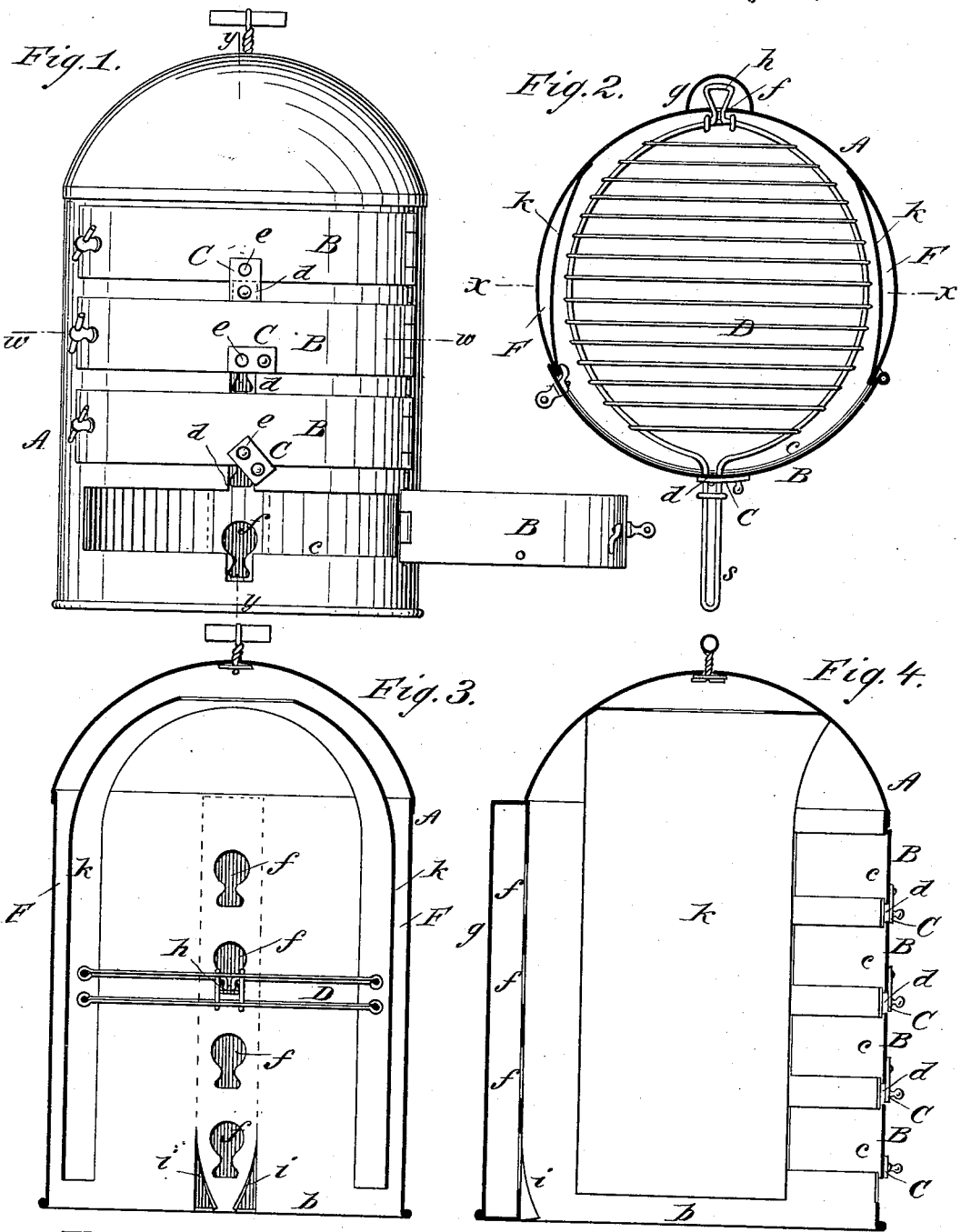
WITNESSES:
Donn Twitchell
C. Sedgwick
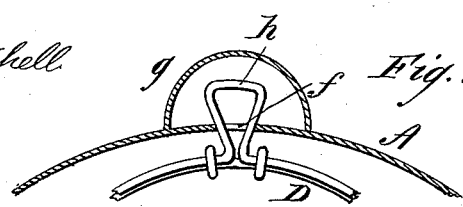
INVENTOR:
C. M. Cooke
BY Munn & Co
ATTORNEYS.

(No Model.)  2 Sheets—Sheet 2.
C. M. COOKE.
GRIDIRON.
No. 322,686.  Patented July 21, 1885.
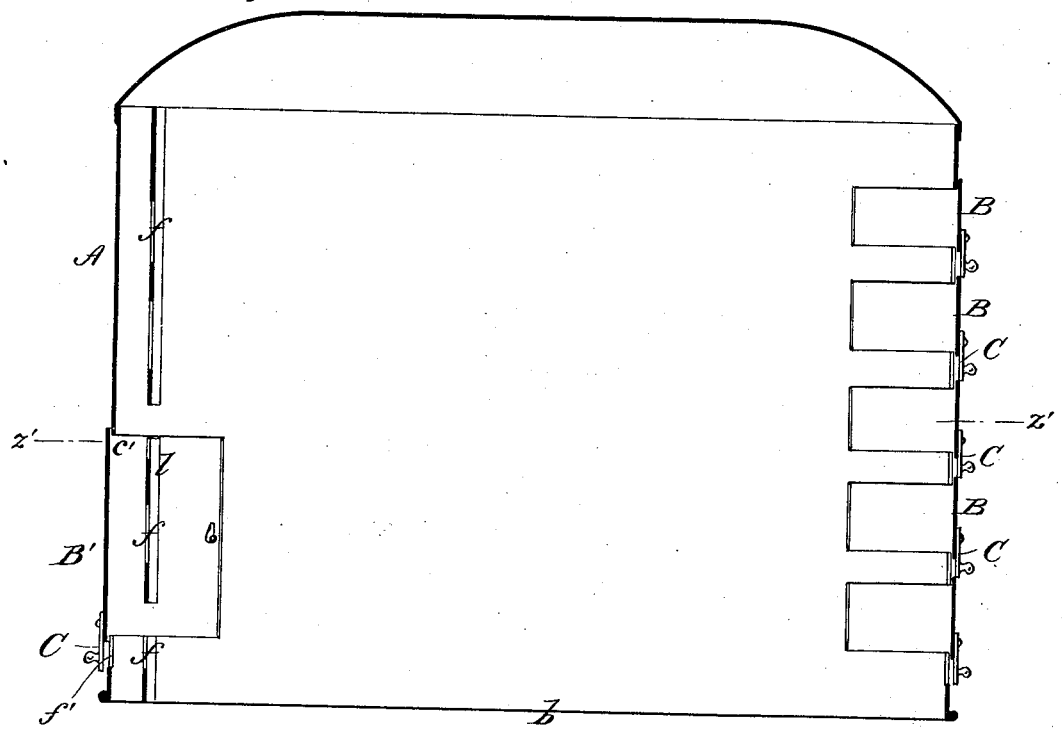
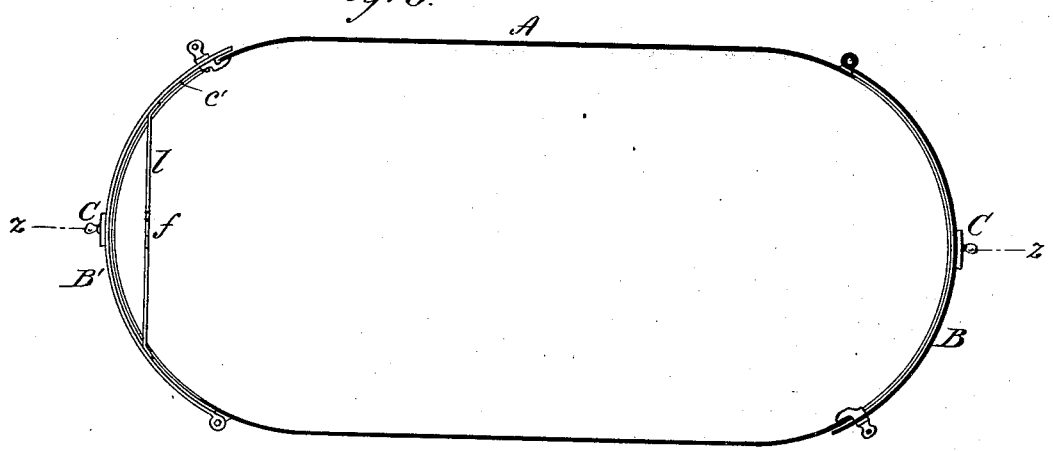
WITNESSES:
Donn Twitchell
C. Sedgwick
INVENTOR:
C. M. Cooke
BY Munn & Co
ATTORNEYS.

UNITED STATES PATENT OFFICE.

CHARLES MATTHEW COOKE, OF BROOKLYN, NEW YORK.

GRIDIRON.

SPECIFICATION forming part of Letters Patent No. 322,686, dated July 21, 1885.

Application filed February 18, 1885. (No model.)

*To all whom it may concern:*

Be it known that I, CHARLES M. COOKE, of Brooklyn, in the county of Kings and State of New York, have invented certain new and useful Improvements in Cooking Apparatus, of which the following is a full, clear, and exact description.

This invention relates to apparatus or devices for broiling, frying, and other cooking operations in which a vessel or case constituting a removable attachment to a range or cooking-stove is used, said case being designed to sit on top of the range or stove, and having a closed top but open bottom, so that on being placed over one or more of the pot-holes, or, if more than one pot-hole, over adjacent holes with their dividing cross-bar removed, the interior of the case is directly exposed to the heat of the fire, and by the case having an opening up its front and suitable supports for a gridiron or frying-pan the articles to be cooked may be adjusted to different heights over the fire without removing said utensils from the case; likewise the gridiron, if such be used, be turned while in the case.

The invention consists in certain novel constructions and combinations of parts in a cooking apparatus of this description, whereby greater conveniences are afforded, the escaping odors in cooking are prevented from escaping into the kitchen or cooking-apartment, and are returned to the fire for consumption by the gaseous products of combustion, as hereinafter fully described, and pointed out in the claims.

Reference is to be had to the accompanying drawings, forming part of this specification, in which similar letters of reference indicate corresponding parts in all the figures.

Figure 1 represents a front elevation of a cooking apparatus embodying my invention as more especially designed to be placed over a single pot-hole of a range or stove; Fig. 2, a horizontal section of the same on the line $w\ w$ in Fig. 1, showing also a gridiron in place within the case; Fig. 3, a vertical section on the line $x\ x$ in Fig. 2, and Fig. 4 a vertical section on the line $y\ y$ in Fig. 1; Fig. 5, a vertical longitudinal section, and Fig. 6 a horizontal section, on the lines $z\ z$ and $z'\ z'$, respectively, of the apparatus as constructed more especially for use over two or more pot-holes, with their dividing cross-bars removed, and Fig. 7 is a horizontal section upon a larger scale of the rear portion of the case, and top view of the gridiron or cooking utensil in part, showing a peculiar projection on said utensil for holding it steady or in place.

Referring in the first instance more particularly to the first four figures of the drawings, A is the outer case of the apparatus, of cylindrical or any other suitable form, with a dome or other closed top and an opening, $b$, in its bottom designed to fit over one of the pot-holes in the range or stove. Said case may be made of any desired height to vary the distance of the cooking utensils used within it from or above the fire. The opening in front or down the one side of it, to provide for raising or lowering the gridiron or cooking utensil to different heights, as described, is not of a regular or unbroken configuration, closed by doors extending the full height of the case, but is formed by a series of enlarged or wide doorways, $c$, arranged one above the other, having independent doors B, similarly arranged and connected intermediately of their length or width by narrow or neck-like openings, $d$, which are closed, when required, by independent small lids or covers C, pivoted, as at $e$, or otherwise suitably attached to the main doors B. The enlarged openings or doorways $c$ admit of the insertion of the gridiron or frying-pan, while the connecting openings $d$, in conjunction with said doorways, allow of the handle of the cooking utensil passing up or down as said utensil is adjusted to its different heights from the fire; and on closing the several doors B and their attached smaller covers C over or about the whole upright opening in front of the case, excepting the one cover C for projection of the handle of the utensil in front at the height or level the utensil is required to be held, all escape of the cooking-odors will be prevented from passing into the apartment. This construction is more especially intended for the use of the gridiron in cooking. Thus in Figs. 2 and 3, D indicates the gridiron, and $s$ its handle, arranged to pass out through one of the neck-openings $d$, and which may rest on the door B below said opening, while the back of the gridiron is supported on the lower marginal surface of an aperture, $f$, in the back of the case, there being the same number of apertures $f$ as there are front openings, $d$, and such two sets of openings, $d$ and $f$, being arranged opposite each other, and the apertures $f$ in the back of the case being inclosed by an upright trunk or outside tubular projection, $g$. The apertures $f$ are of a peculiar construction, being of an enlarged capacity above and a smaller area below, united by a narrow or neck-like space, so that on providing the gridiron or frying-pan with a rear projection or attachment, $h$, of narrow construction where it joins said iron and spreading out in the rear, the gridiron may be supported in the rear as well as in the front by the handle, by projecting the attachment $h$ through the larger part of the opening $f$, and then allowing said attachment where it is narrowest to drop down through the neck-like portion of said opening till it rests on the lower marginal base of the opening $f$. Thus placed the gridiron will be firmly supported in position and prevented from being accidentally drawn out or away from its supports, the enlarged portion of the attachment $h$ not being able to pass through the lower contracted portion of the opening $f$; but such contraction does not prevent the gridiron from being turned or reversed by its handle, when required, without removing it from the case. The lower doorway $c$ may be used for the introduction of an ordinary frying-pan without the attachment $h$ into the case, and the back of the case, in front of the tubular upright $g$, be made with lower wings, $i$, for the end of the pan opposite the handle to rest upon.

Down either or opposite sides of the case A are diaphragms $k$, constructed to form, in conjunction with the outside of the case, upright flues F, in open communication with the interior of the case above, and with the opening $b$ below, whereby offensive cooking-odors will pass down into the fire and be consumed, thus keeping the case clear of such odors.

In Figs. 5 and 6 of the drawings, which represent a case of oblong form suitable for placing it over two or more pot-holes of a range or stove, with the dividing cross bar or bars removed, substantially the same construction is shown as regards the case A, having an open bottom, $b$, and irregularly-shaped upright opening in its front or one side or end, closed by doors B and attached covers C, as described, and with the hereinbefore-described rear openings, $f$, as and for the purposes before specified, but omitting the side flues, F, as, by reason of the space provided within the enlarged case for return of the fumes to the fire, such flues are not necessary. The case, too, is fitted with a lower large door, B', on the side opposite the doors B, especially designed for introducing through the way $c'$, which it closes, a frying-pan or other cooking-utensil other than a gridiron, and to give an opportunity to watch and stir or manipulate, as required, the articles being cooked. The door B' may also have a pivoted cover, C', to close an aperture, $f'$, in the case, which aperture, when said cover is raised, serves in conjunction with the lower aperture, $f$, to receive the handle of the frying-pan down within it. The door B' has also an inner diaphragm, $l$, extending down and across it, with one or more of the apertures $f$ in it to provide a support for the gridiron in the rear when the door B' is closed. In some cases the open-bottomed cooking-case A may have only a single doorway, $c$, closed by a door, B, and provided with a lower intermediate opening, $d$, in front for the handle of the cooking utensil to enter down within and find its support or rest. Furthermore, it should be noticed that the attachment or projection $h$ on the gridiron D, frying-pan, or other cooking utensil, which is made to taper horizontally inward, and is more or less elastic, readily jams itself in the lower contracted portions of the opening $f$ when the cooking utensil is pulled outward, thus firmly holding the cooking utensil from turning accidentally or by the weight of the meat or viands in it.

The gridiron D represented in the drawings is the usual double or opening and closing reversible one.

Having thus described my invention, what I claim as new, and desire to secure by Letters Patent, is—

1. The open-bottomed cooking-case A, having a number of doorways, $c$, arranged one above the other and connected by central or intermediate contracted openings, $d$, with one another, in combination with the doors B, substantially as specified.

2. The doors B and covers C, attached thereto, in combination with the open-bottomed case A, having a number of doorways, $c$, arranged one above the other and connected by central or intermediate contracted openings, $d$, essentially as and for the purposes herein set forth.

3. The open-bottomed case A of the cooking apparatus, provided with a series of doors and connected doorways arranged one above the other on the one side of the case, and having a series of inclosed openings, $f$, on its opposite side, of enlarged area above and contracted area below, for adjustment and support of a gridiron or frying-pan introduced within said doorways, substantially as specified.

4. The open-bottomed cooking-case A, with its series of doorways, $c$, connected by openings $d$ on the one side of the case, and a corresponding series of inclosed openings, $f$, on the opposite side of the case, in combination with the separated doors B, the whole being constructed to admit of a gridiron through either of said doorways, and to support said utensil by its handle and at its opposite end, and to allow of the turning of it without opening the door, essentially as described.

5. The combination, with an open-bottomed cooking-case having an inclosed opening, $f$, in its rear of enlarged area above and contracted area below, of a cooking-utensil provided with a horizontally-tapering and elastic or jamming projection, $h$, substantially as and for the purpose herein set forth.

CHARLES MATTHEW COOKE.

Witnesses:
   EDGAR TATE,
   JNO. MATHEW RITTER.